(12) United States Patent
Ydoate et al.

(10) Patent No.: US 8,727,097 B2
(45) Date of Patent: May 20, 2014

(54) RELEASABLE SHOE AND METHOD FOR SHOE SORTER

(71) Applicant: Cinetic Sorting Corp., Louisville, KY (US)

(72) Inventors: Edward Ydoate, Louisville, KY (US); Steven Vann Schroader, Louisville, KY (US)

(73) Assignee: Cinetic Sorting Corp., Louisville, KY (US)

( * ) Notice: Subject to any disclaimer, the term of this patent is extended or adjusted under 35 U.S.C. 154(b) by 0 days.

(21) Appl. No.: 13/971,359

(22) Filed: Aug. 20, 2013

(65) Prior Publication Data

US 2013/0334016 A1      Dec. 19, 2013

Related U.S. Application Data

(63) Continuation of application No. 13/406,857, filed on Feb. 28, 2012, now Pat. No. 8,602,201.

(51) Int. Cl.
*B65G 47/10* (2006.01)

(52) U.S. Cl.
USPC .............................. 198/370.02; 198/370.07

(58) Field of Classification Search
USPC ....................................... 198/370.02, 370.07
See application file for complete search history.

(56) References Cited

U.S. PATENT DOCUMENTS

| | | | |
|---|---|---|---|
| 4,738,347 A | 4/1988 | Brouwer et al. | |
| 5,127,510 A * | 7/1992 | Cotter et al. | 198/370.02 |
| 5,333,715 A | 8/1994 | Sapp | |
| 5,613,591 A | 3/1997 | Heit et al. | |
| 6,044,956 A * | 4/2000 | Henson et al. | 198/370.02 |
| 6,098,787 A * | 8/2000 | Murano | 198/500 |
| 6,860,376 B1 * | 3/2005 | Heit et al. | 198/370.02 |
| 6,860,383 B2 * | 3/2005 | Veit et al. | 198/815 |
| 7,198,145 B1 * | 4/2007 | Brown et al. | 198/370.02 |
| 7,249,668 B2 * | 7/2007 | Verploegen et al. | 198/370.02 |
| 7,628,265 B2 * | 12/2009 | Verploegen et al. | 198/370.02 |

FOREIGN PATENT DOCUMENTS

| | | |
|---|---|---|
| EP | 1371584 A2 | 12/2003 |
| WO | WO-2010/053367 A1 | 5/2010 |

OTHER PUBLICATIONS

European Search Report, The Hague, European Patent Office for corresponding EP 13 15 6875 application; date of completion of the search: May 30, 2013.

* cited by examiner

*Primary Examiner* — Leslie A Nicholson, III
*Assistant Examiner* — Keith R Campbell
(74) *Attorney, Agent, or Firm* — Harness, Dickey & Pierce, P.L.C.

(57) ABSTRACT

A sorter conveyor system includes a conveyor forming an upwardly facing support surface for conveying objects. The support surface includes slots oriented transversely to the conveying direction and a plurality of shoe assemblies mounted for sliding movement along respective slots for transversely discharging objects from the conveying surface. Each shoe assembly includes a carrier disposed below the conveying surface, and a shoe disposed above the support surface. The shoe and the carrier together form a releasable connection therebetween. The releasable connection is configured to enable the shoe, in response to an undesirable force applied thereto, to detach completely from the carrier without breakage or failure of any part of the shoe assembly, and to be manually reattached without the use of tools or special skills. Various related methods are additionally disclosed.

24 Claims, 7 Drawing Sheets

RELEASABLE SHOE AND METHOD FOR SHOE SORTER

FIELD OF TECHNOLOGY

The present disclosure relates to shoe sorters for the conveying and discharging of objects at respective destinations, and in particular to releasable shoes which become disconnected in response to being acted upon by an undesirable external force and related methods.

BACKGROUND

This section provides background information related to the present disclosure which is not necessarily prior art.

A shoe sorter is a type of sorter conveying system composed of a conveyor which moves in a conveying direction along a conveying route. Mounted on the conveyor are pusher shoes which are movable relative to the conveyor in a direction transversely relative to the conveying direction. Each shoe is coupled to a guide pin or wheel which can engage a guide track mounted beneath the conveying surface for determining the lateral position of the shoe relative to the conveyor surface. The rail arrangement includes diverters which can divert the travel direction of the guide pin or wheel from the conveying direction to a direction oriented transversely relative to the conveying direction. In that fashion, the shoes can push items transversely from the conveyor and onto a chute at appropriate destination sites along the conveying route. Examples of such sorters include U.S. Pat. No. 4,738,347 issued to Brouwer et al on Apr. 19, 1988, U.S. Pat. No. 5,333,715 issued to Sapp on Aug. 2, 1994, and U.S. Pat. No. 5,613,591 issued to Heit et al. on Mar. 25, 1997.

It can occur, however, that backups of objects on the chutes can occur. When that happens, it is possible that the shoes will push subsequent objects toward a blocked chute that does not admit entry of those objects. Accordingly, the shoes may be subjected to considerable undesirable (e.g., above a predetermined acceptable level) external forces that can damage the shoes, the conveyor, and/or the objects being conveyed. Each shoe can be attached by a connector element which fails or breaks in response to the application of the external forces to allow the shoe to detach from its drive pin (e.g., see the connector elements 28, 228, and 260 disclosed in U.S. Pat. No. 7,628,265 issued to Verploegen et al. on Dec. 8, 2009; and the connector element 14 disclosed in U.S. Pat. No. 7,198,145 issued to Brown et al. on Apr. 3, 2007). When that occurs, reattaching the shoe requires that the failed or broken part be replaced and/or the use of tools. Reattachment can also require special knowledge and skills to perform the operation correctly. Such replacement processes can be complicated by the need to obtain replacement parts, tools, etc., which can be time consuming; possibly resulting in appreciable down-time of the sorting conveyor.

SUMMARY

In one aspect of the disclosure, a sorter conveyor apparatus includes an endless upwardly facing conveying surface movable in a conveying direction. The conveying surface is defined by a plurality of surfaces separated by a plurality of slots extending in a transverse direction relative to the conveying direction. A plurality of shoe assemblies, that each include a shoe disposed above the conveying surface and a carrier disposed below the conveying surface. Each of the plurality of shoe assemblies extends through at least one of the slots in the conveying surface to permit each shoe assembly to move in the transverse direction while also moving in the conveying direction with the conveying surface. Each of the shoe assemblies includes a snap-fit connection coupling the shoe and the carrier together. The snap-fit connection has a structure which permits the shoe to detach from the carrier in response to an undesirable force acting on the shoe without damaging any part of the shoe assembly. The snap-fit connection further has a structure that permits the shoe to be fully recoupled to the carrier manually without the use of tools after being detached from the carrier.

In another aspect of the disclosure a sorter conveyor apparatus includes an endless upwardly facing conveying surface movable in a conveying direction. The conveying surface is defined by a plurality of surfaces separated by a plurality of slots extending in a transverse direction relative to the conveying direction. A plurality of shoe assemblies that each include a shoe disposed above the conveying surface and a carrier disposed below the conveying surface. Each of the plurality of shoe assemblies includes a bridge extending through at least one of the slots in the conveying surface to permit each shoe assembly to move in the transverse direction while also moving in the conveying direction with the conveying surface. Each of the shoe assemblies includes a snap-fit connection coupling the shoe and the carrier together. The snap-fit connection includes two connector projections that each include a hook member having a locking surface, and respective cooperating locking surfaces against which one of the hook members is engaged to retain the shoe and the carrier together. Each of the shoe assemblies further includes two drive projections, with each drive projection being received in a cooperating opening to transfer forces between the shoe and the carrier when the shoe is driven in the transverse direction without the shoe detaching from the carrier absent exposure to an undesirable force.

In a further aspect of the disclosure, a sorter conveyor apparatus includes an endless upwardly facing conveying surface movable in a conveying direction. The conveying surface is defined by a plurality of surfaces separated by a plurality of slots extending in a transverse direction relative to the conveying direction. A plurality of shoe assemblies that each include a shoe disposed above the conveying surface and a carrier disposed below the conveying surface. Each of the plurality of shoe assemblies includes a bridge extending through at least one of the slots in the conveying surface to permit each shoe assembly to move in the transverse direction while also moving in the conveying direction with the conveying surface. Each of the shoe assemblies comprising a releasable snap-fit connection coupling the shoe and the carrier together. The releasable snap-fit connection includes a connector projection, and a cooperating connector member upon which the hook members engage to retain the shoe and the carrier together. The shoe assembly comprises a flexible material to bias the connector projection against the cooperating member to increase the force required to detach the shoe.

In yet another aspect of the disclosure, a sorter conveyor method is provided for use with an endless upwardly facing conveying surface movable in a conveying direction. The conveying surface is defined by a plurality of surfaces separated by a plurality of slots extending in a transverse direction relative to the conveying direction. The method includes providing a plurality of shoe assemblies, with each shoe assembly including a shoe disposed above the conveying surface and a carrier disposed below the conveying surface. Each of the plurality of shoe assemblies extends through at least one of the slots in the conveying surface. The method can include coupling the shoe and the carrier together using a snap-fit connection; and causing at least some of the shoe assemblies to move in the transverse direction while also moving in the conveying direction with the conveying surface; Upon exposure to an undesirable force acting upon the shoe, the shoe automatically detaches from the carrier at the snap-fit connection without damaging any part of the shoe assembly, including the snap-fit connection. After such detaching, the method includes fully reattaching the shoe to the carrier manually without the use of tools using the undamaged shoe, including the undamaged snap-fit connection.

DETAILED DESCRIPTION

Exemplary embodiments are disclosed herein, including numerous specific details, such as examples of specific components, devices, and methods, to provide a thorough understanding of embodiments of the present disclosure. It will be apparent to those skilled in the art that the specific details need not be employed, that the development described herein may be embodied in many different forms. Neither the embodiment, nor its specific details should be construed to limit the scope of the disclosure. In some cases, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The method steps, processes, and operations described herein are not to be construed as necessarily requiring their performance in the particular order discussed or illustrated, unless specifically identified as an order of performance. It is also to be understood that additional or alternative steps disclosed herein may be employed in any of the various embodiments discussed herein, regardless of whether such additional or alternative step is expressly disclosed for use in a particular embodiment herein.

Figure 1:
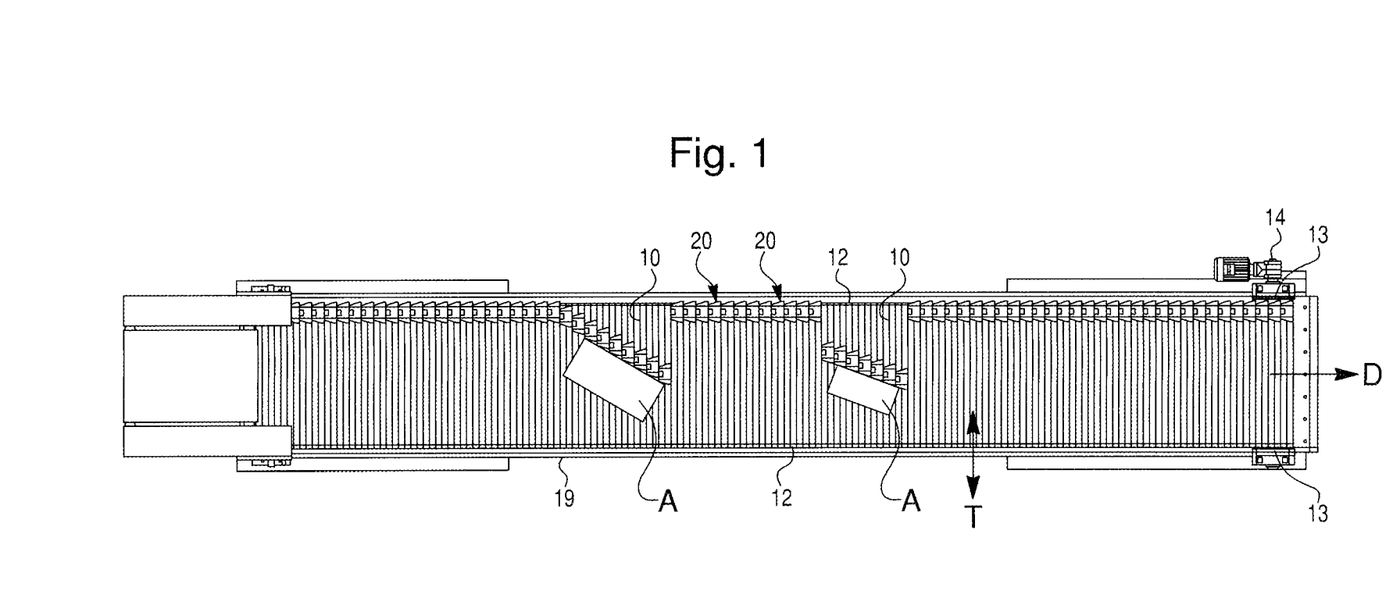
FIG. 1 is a top plan view of a shoe sorter.
Figure 2:
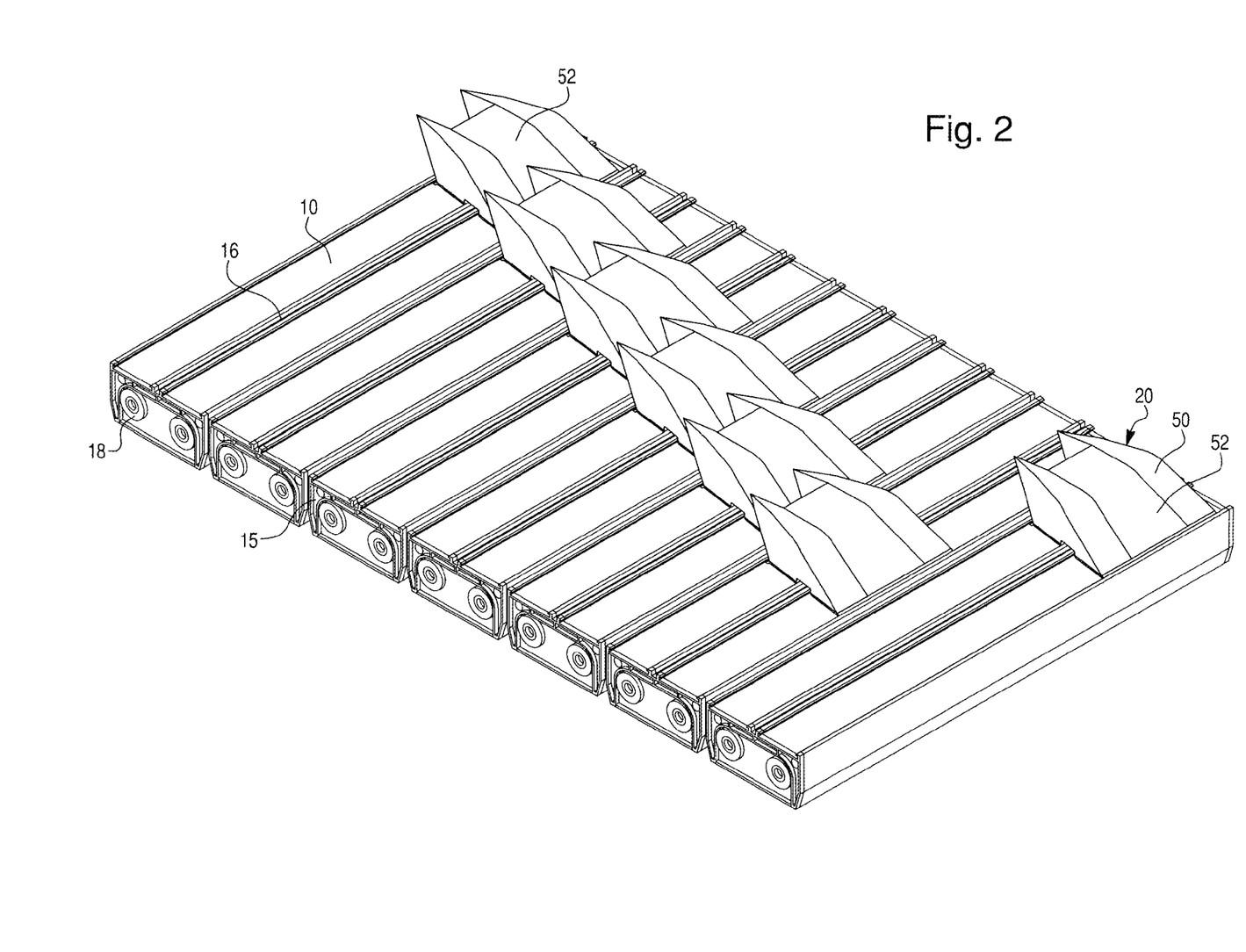
FIG. 2 is a top perspective view of a section of the shoe sorter of FIG. 1.
Figure 3:
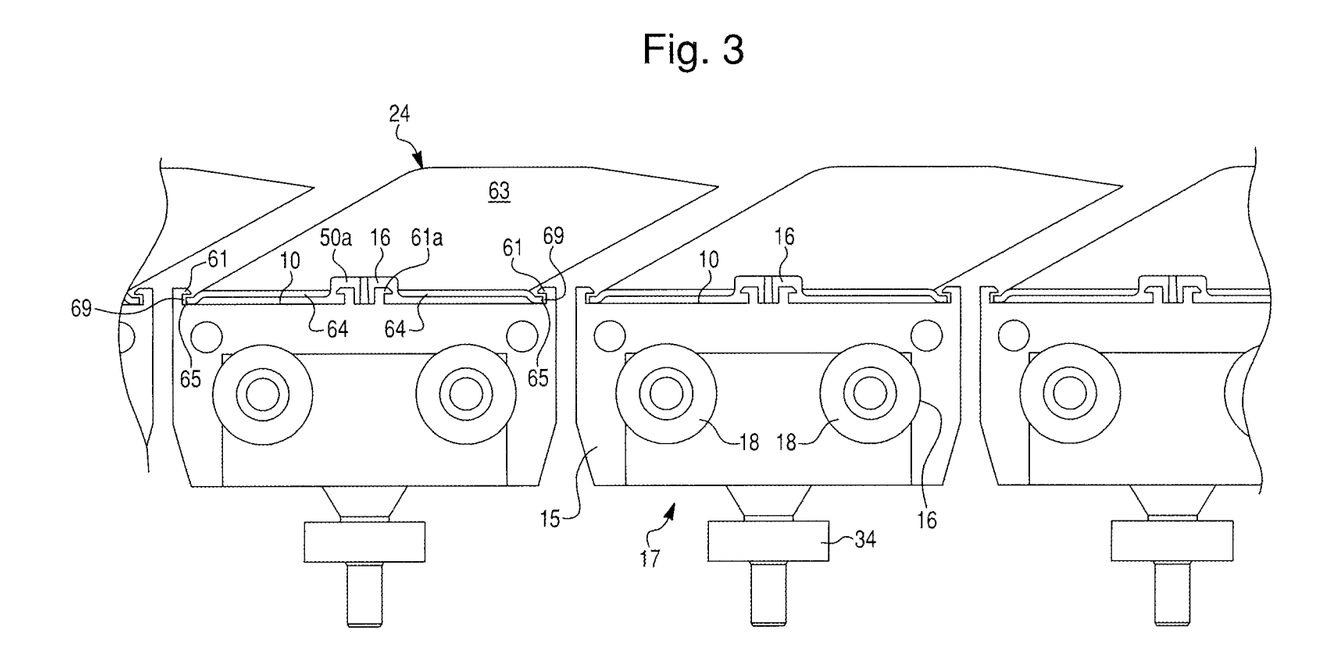
FIG. 3 is an elevational view of one side of the shoe sorter.

Depicted in FIGS. 1-3 is an exemplary shoe sorter comprising an endless conveyor for conducting objects A in a conveying direction D past destination sites. The conveyor includes an upwardly facing support surface on which the objects are disposed. The support surface can be formed by support rails 15 which are connected to roller chain strands 12 driven in the conveying direction D by any suitable drive mechanism, such as sprockets 13 driven by a motor 14. Each support rail 15 includes a pair of horizontal portions 10 that are spaced apart in the direction D to form a slot 16 extending longitudinally along the rail, i.e., in a direction T transversely of the conveying direction D. Attached to each end of the support rail 15 can be an insert 17 (see FIG. 3) which carries a pair of wheels 18 arranged to travel on a main frame 19 of the sorting conveyor.

Mounted on the conveyor are shoe assemblies 20, each arranged to travel along a respective rail 15 in the transverse direction T. Each shoe assembly 20 includes a carrier 22 and a shoe 24 attached thereto (See FIG. 5). The carrier 22 includes a main body 26 arranged within the rail beneath the horizontal portions 10. Projecting downwardly from the main body 26 is a pin 32 on which a wheel 34 can be rotatably mounted.

Figure 5:
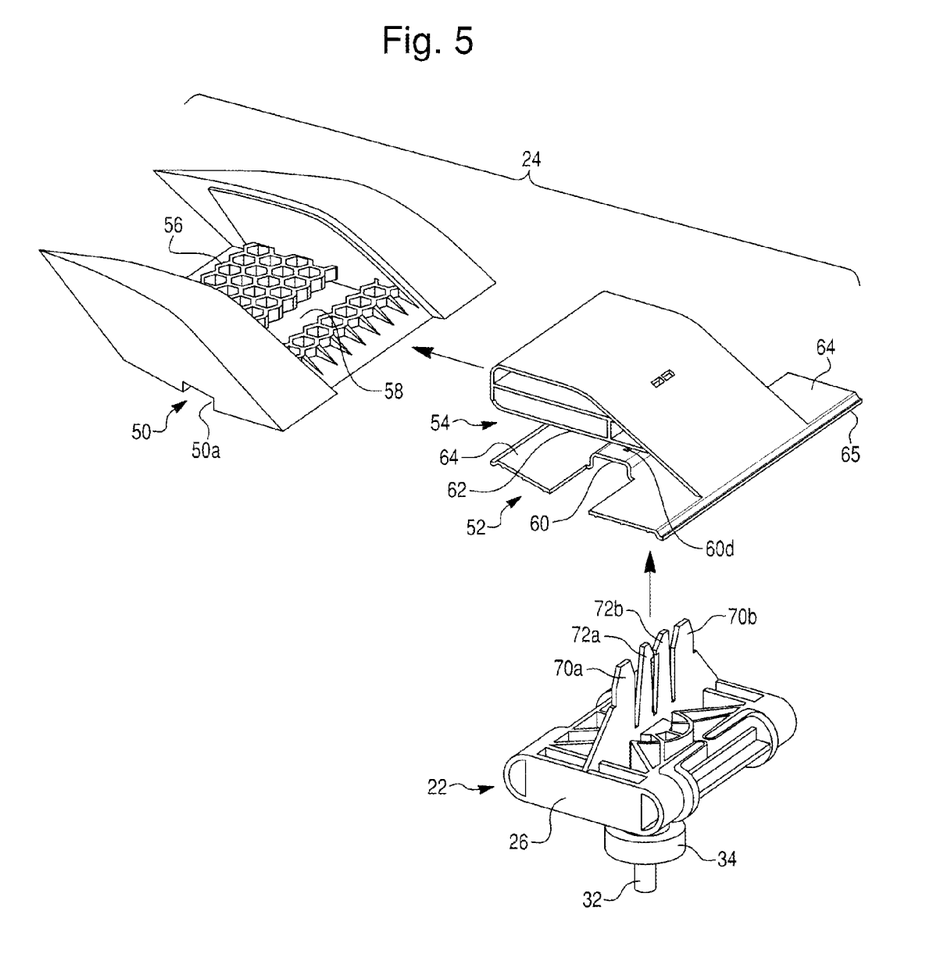
FIG. 5 is an exploded view of the shoe assembly of FIG. 4, depicting a carrier and a shoe of the shoe assembly.

The shoe 24, which can be arranged to slide along a respective support rail, preferably comprises two sections, i.e., a base 52 mounted to a cover 50. As seen in the drawings, it is not necessary that the cover 50 completely enclose the base 52. The cover 50, however, is the component intended to be the primary, if not exclusive, component of the shoe assembly that directly contacts objects A on the conveyor. Cover 50 can be preferably formed of a thermoplastic elastomeric material, such as Santoprene® 201-64, and the base 52 can be preferably formed of a stiffer material, such as a polyoxymethylene like Delrin® 100ST which is characterized by high mechanical strength and rigidity, long-term fatigue endurance, resilience and resistance to creep. The base 52 includes a recess 54 which receives a web portion 56 of the cover 50, preferably by a force fit. The web portion 56 includes an aperture 58 formed therein, which becomes situated between lower and upper panels 60, 62 of the base 52 when the cover 52 is interconnected therewith. The web portion 56 can be compressed when inserted into the recess 54 to create a force or friction fit with the base 52. In addition, the elastomeric material of the cover 50, and specifically web portion 56, operates as a biasing member to bias the lower and upper panels 60, 62 away from one another for reasons to be explained. The cover 50 further includes a pair of identical end portions 63 disposed on opposite ends of the web portion 56 for making direct contact with conveyed objects.

The base 52 includes a pair of feet 64 whose end edges 65 are slidable within respective grooves 69 formed by hook-shaped portions 61 of the rail 15 that extend in the direction T (see FIG. 3). It will be appreciated that objects being conveyed will rest directly on the tops of the hook-shaped portions which together define the support surface of the conveyor. For that reason, center hook-shaped portions 61a are provided midway between the outer hook-shaped portions 61, to provide additional support for the objects, but such center hook-shaped portions do not interact with the shoe assemblies, because the shoes include respective recesses 50a in which the center hook-shaped portions are disposed.

Figure 6:
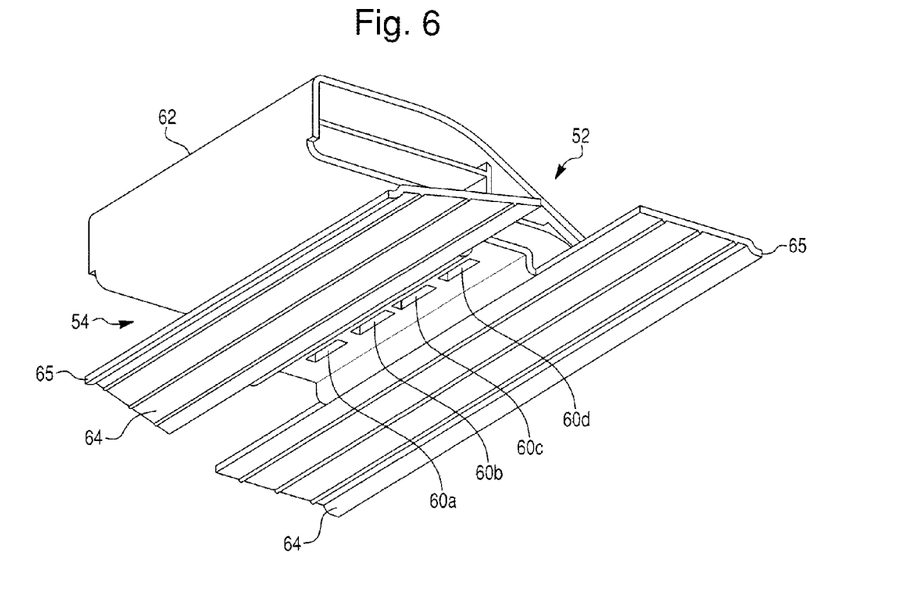
FIG. 6 is a bottom perspective view of a base of the shoe of FIG. 5.
Figure 7:
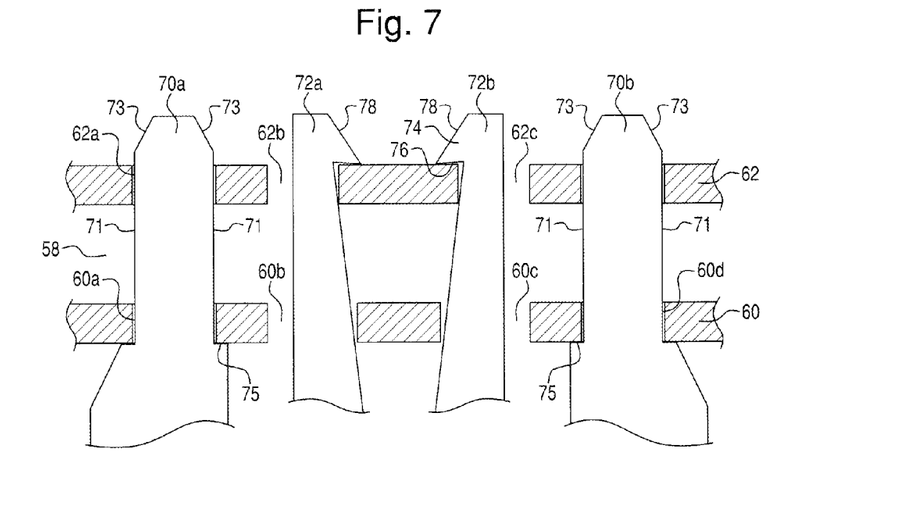
FIG. 7 is an enlarged fragmentary view of a releasable connection between the carrier and the shoe's base.

Each of the lower and upper panels 60, 62 has a set of openings formed therein, i.e., lower openings 60a-d in the lower panel, and upper openings 62a-d formed in the upper panel (see FIGS. 6-7). The lower openings 60a-d are vertically aligned with respective upper openings 62a-d.

The main body 26 of the carrier 22, which carrier can also preferably be formed of Delrin®, includes four projections or tabs, namely, a pair of thin, flat upstanding drive projections 70a, 70b, and a pair of thin, flat upstanding connector projections 72a, 72b disposed between the drive projections, as shown in FIG. 7. The four projections 70a,b and 72a,b lie in a common plane which contains the respective slot 16 (see FIG. 5). The four projections project sequentially upwardly through: the slot 16 of the respective support rail 15, the respective lower openings 60a-d, the aperture 58 formed in the web 52, and the respective upper openings 62a-d. The shoe assembly can be driven in the transverse direction T by the drive projections 70a,b. It will be appreciated that the shoe assemblies are driven in the conveying direction D by the support rails 15, due to the engagement of the feet end edges 65 within the grooves 69, whereas the drive projections 70a,b only drive the shoe assemblies in the transverse direction T, thereby enabling the drive projections to be relatively thin.

Each drive projection 70a,b includes opposite vertical surfaces 71 which engage the edges of a respective upper opening 62a,d for transferring drive forces from the carrier 22 to the shoe to displace the shoe in either direction along the slot 16. The upper end of each drive projection can be beveled to form two surfaces 73 which are inclined relative to vertical. Each of the drive projections 70a,b also includes an upwardly facing shoulder 75 on which the lower panel 60 of the base 52 rests during normal travel of the shoe assemblies.

Each of the connector projections 72a,b can be somewhat elastically flexible in the direction T and has a hook-shaped upper end, with the hooks 74 thereof pointing toward one another. Each hook 74 includes a downwardly facing shoulder 76 operating as a locking surface arranged to engage the upper surface of upper panel 62 surrounding a respective upper opening 62b,c operating as a cooperating locking surface to releasably connect the shoe 24 to the carrier 22. As explained earlier, the lower and upper panels 60, 62 are biased away from one another by the elastic web portion 56 of the cover 50. As a result, the downwardly facing shoulders 76 operating as a locking surfaces are biased against a respective upper surface of upper panel 62 operating as a cooperating locking surface and surrounding upper opening 62b,c. This biasing arrangement can also operate to bias shoes 24 down against surface 10, which can help insure ends 65 of feet 64 of base 52 are positioned within the grooves 69. This biasing arrangement can also tend to urge the carrier upwardly to press the carrier 22 upwardly against undersides of the horizontal portions 10. Thus, the biasing arrangement can reduce rattling as the shoe assemblies move along the support rails 15.

Shoulders 75 associated with the drive projections 70a,b can operate to limit the biasing forces being exerted on shoe 24. For example, shoulder 75 can be positioned to limit how much downward force can be applied to shoe 24, thereby limiting the friction created as shoe 24 slides along the conveying surface 10. Shoulders can additionally or alternatively be positioned to increase the locking force pressing the downwardly facing shoulders 76 or locking surfaces against respective upper surfaces of upper panel 62 or cooperating locking surfaces. Thus, the biasing arrangement can generate a high locking biasing force at the interface of the locking surfaces associated with the connector projections while generating a much smaller downward force at the interface between shoe 24 and conveying surface 10.

As can be seen from FIG. 7, each of the openings 60b, 60c, 62b and 62c can be of greater width than the section of the respective connector projection 72a, 72b disposed therein. In the normal condition of the shoe assemblies, e.g., situated at either side of the conveyor or when objects being pushed transversely by the end portions 63 of the shoes 24, the shoes 24 have not encountered an undesirable obstruction to movement (such as a jam-up of objects on a discharge chute). In this normal condition, the shoulders 76 of the hooks 74 overlie respective surface areas of the upper panel 62 operating as a cooperating connector member to thereby secure the shoe 24 to the carrier 22.

Figure 4:
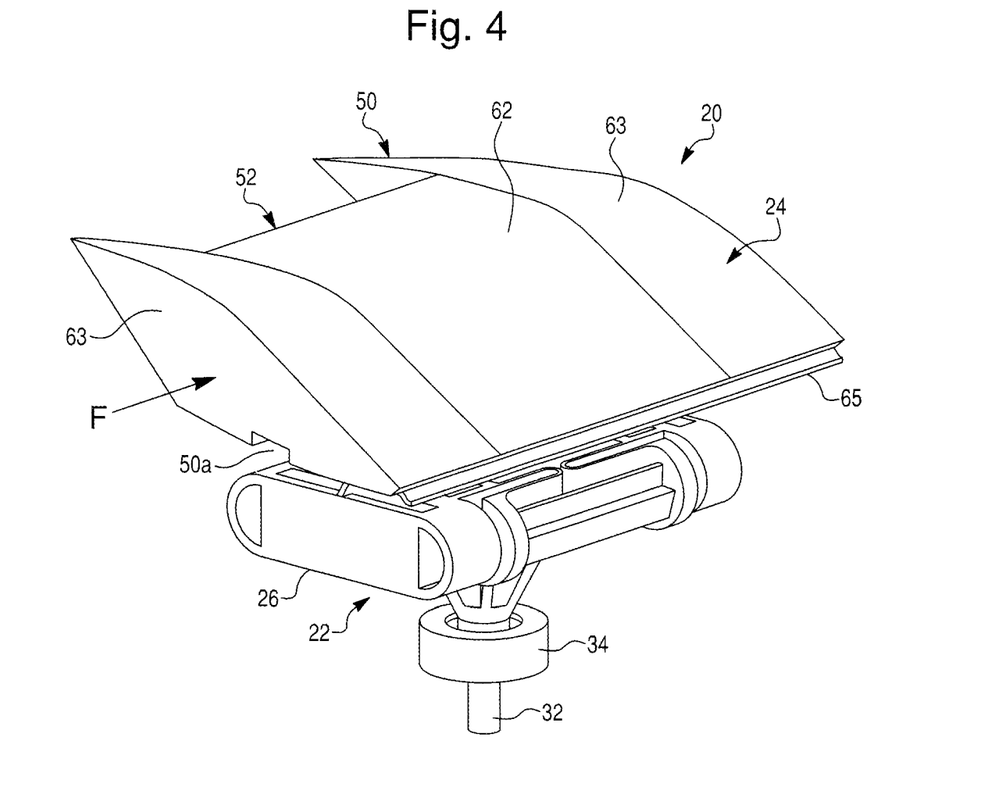
FIG. 4 is a perspective view of a shoe assembly for displacing objects from the shoe sorter.
Figure 8:
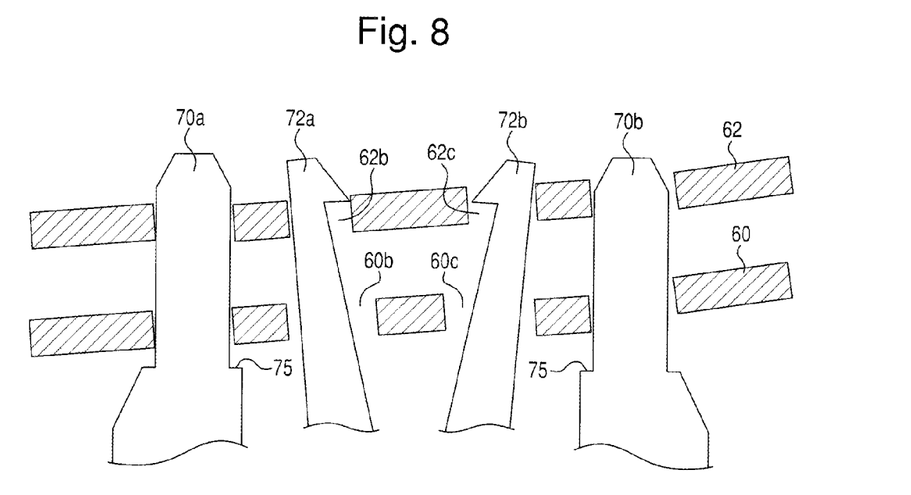
FIG. 8 is a view similar to FIG. 7, depicting the shoe being dislodged from the base.

However, while pushing an object toward a destination, the object may encounter a jam-up of objects, wherein the ends of the shoes pushing the object become subjected to a resistance force F (see FIG. 4). That force may be of an undesirable magnitude thereby causing the ends of one or more of the shoes to be forced upwardly and cause the hooks of the respective connector projections 72a,b to flex elastically, enabling the shoe to become detached from the carrier 22, as shown in FIG. 8. The flexibility of the connector projections 72a,b ensures that such shoe, or shoes, can become completely detached from the carrier 22 without damaging or breaking any of the parts of the shoe assembly. After the jam-up is removed, the detached shoe(s) can easily be manually reattached to the carrier without requiring the use of any tools by simply positioning the shoe 24 and pressing downwardly on the shoe 24 such that the lower panel 60 passes downwardly along the drive projections 70a,b aided by the beveled upper ends 73 of those drive projections. Each hook 74 can also include an upwardly facing surface 78 which can be inclined relative to vertical and disposed in downwardly converging relationship with the inclined surface 78 of an adjacent connector projection. The upper panel 62 will contact the downwardly converging surfaces 78 of the connector projections 72a,b to elastically spread the connector projections away from one another. That enables the upper panel 62 to move downwardly past the hooks 74, whereupon the connector projections snap back to the state shown in FIG. 7. The upper panel 62 will also slide down along the drive projections 70a,b aided by the beveled upper ends 73 of the drive projections.

It will be appreciated that the carrier's connector-projections 72a,b and the cooperating connector member in the form of panel 62 with its upper surface and associated openings 62b,c together form a releasable connection between the shoe and the carrier which prevents damage occurring to either the shoe or the carrier when the shoe is detached in response to encountering a jam-up of discharging objects. Thus, a detached shoe can be easily reattached manually without the use of tools and without having to replace any damaged or broken parts of the shoe assembly.

Figure 9:
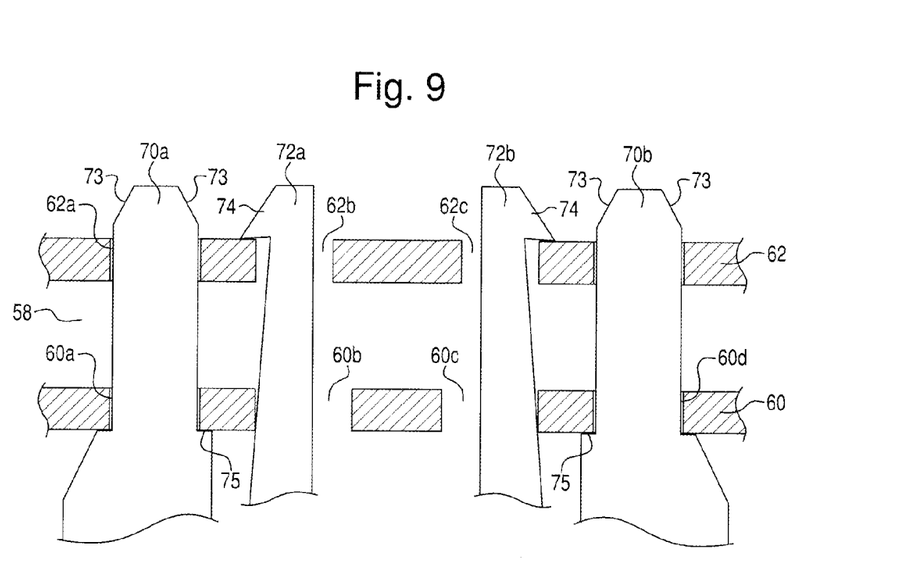
FIG. 9 is a view similar to FIG. 7, showing an alternative configuration of the releasable connection.

Modifications, additions, and subtractions may be made to the exemplary embodiment disclosed above, without departing from the scope of the appended claims. For example, instead of the connector projections being arranged with their hooks 74 pointing toward each other, the hooks could instead point away from one another, as shown in FIG. 9. Also, even though both the carrier and the shoe's base are disclosed as being formed of an elastomeric material, it is possible that either the carrier or the base could be formed of a stiff material.

Further, alternative releasable connections can be envisioned by one of skill in the art that provide easy manual reattachment without the use of tools and without having to replace any damaged or broken parts of the shoe assembly. Examples of such releasable connections include alternative snap-fit connections that have cooperating protrusions and detents, instead of the cooperating hooks and surfaces expressly disclosed herein.

Various related methods are apparent based on the foregoing discussion. For example, such methods can include providing an endless upwardly facing conveying surface 10 movable in a conveying direction, wherein the conveying surface 10 can be defined by a plurality of surfaces separated by a plurality of slots 16 extending in a transverse direction relative to the conveying direction. The methods can include disposing a shoe 24 above the conveying surface 10 and disposing a carrier 22 below the conveying surface 10 and coupling the shoe 24 and the carrier 22 together to form a shoe assembly 20. The disposing and coupling steps can be repeated to form a plurality of shoe assemblies 20 with each shoe assembly 20 extending through one of the slots 16 in the conveying surface 10 to permit each shoe assembly 20 to move in the transverse direction while also moving in the conveying direction with the conveying surface 10.

The methods can include any of providing the shoe assembly 20 with a snap-fit connection 72a,b and 62 for coupling each shoe 24 and carrier 22 together; releasing the snap-fit connection to permit the shoe 24 to detach from the carrier 22 without damaging any part of the shoe assembly 20 in response to an undesirable force acting on the shoe 24; and manually reconnecting the snap-fit connection to permit the shoe 24 to be fully recoupled to the carrier 22 without the use of tools after being detached from the carrier 22.

The methods can include any of providing the snap-fit connection with one, two, or more connector projections 72a,b that can each include a hook member 74 that can have a locking surface 76; and providing respective cooperating locking surfaces 62 (adjacent openings 62b,c) which the hook member 74 locking surfaces 76 engage flat against to retain the shoe 24 and the carrier 22 together.

The methods can include any of providing each of the shoe assemblies 20 with one, two, or more drive projections 70a,b; coupling the shoe 24 and the carrier 22 together to cause each drive projection 70a,b to be received in a cooperating opening 62a,d and 60a,d to transfer forces between the shoe 24 and the carrier 22 when the shoe can be driven in the transverse direction without the shoe 24 detaching from the carrier 22 unless the shoe is exposed to an undesirable force; providing the connector members 72a,b, the drive projections 70a,b, or both as thin members having major surfaces extending in the transverse direction; providing a drive projection 70a,b adjacent a connector projection 70a,b so that the projections are aligned in a common plane; and aligning the common plane with a corresponding slot 16 of the endless conveying surface 10.

The methods can include any of flexing the shoe assembly 20 while coupling the shoe 24 and carrier 22 together to bias the connector projection 72a,b against the cooperating member 62 to increase the force required to detach the shoe 24 from the carrier 22; providing the connector projection 72a,b as a locking surface 76 which can be part of a hook member 74; providing the cooperating member 62 as a cooperating locking surface which can be adjacent an opening 62b,c. Biasing a flat locking surface 76 flat against respective flat cooperating locking surface 62 which can increase the force coupling the shoe 24 and the carrier 22 together; and flexing the shoe assembly 20 while coupling the shoe 24 and carrier 22 together to bias the locking surface 76 against the cooperating locking surface 62 to increase the force required to detach the shoe 24 from the carrier 22.

The methods can include any of providing the endless conveying surface 10 with a groove 69 extending in the transverse direction formed by a hook-shaped portion 61 extending in one of the conveying direction and an opposite direction to the conveying direction; providing the shoe 24 with a cooperating edge 65, capturing the cooperating edge 65 within the groove 69 formed by the hook-shaped portion 61; providing the endless conveying surface 10 with an other opposing groove 69 extending in the transverse direction formed by a hook-shaped portion 61 extending in the other of the conveying direction and an opposite direction to the conveying direction; providing each shoe 24 with an other, opposing cooperating edge 65; capturing the other cooperating edge 65 with the other hook shaped portion 61; sliding the edges 65 along the grooves 69; and flexing the shoe assembly 20 while coupling the shoe 24 and carrier 22 together, which can bias the shoe 24 against the conveying surface 10 and can facilitate one or both of the edges 65 being captured within the respective grooves 69.

The methods can include any of assembling the shoe 24 from a base 52 and a cover 50 disposed above the conveying surface 10; positioning the snap-fit connection to detach both the base 52 and cover 50 from the carrier 22 in response to the undesirable force acting on the shoe 24; providing one, two, or more of the connecting projections 72a,b, and one, two, or more of the drive projections 70a,b, which can be positioned to extend from the carrier 22 through one of the plurality of slots 16 above the conveying surface 10; visually identifying the location of a carrier 22 under the conveying surface 10 from which a shoe 24 has detached by visually locating the connector projections 72a,b, drive projections 70a,b, or both that extend above the conveying surface 10; and using the connector projections 72a,b, drive projections 70a,b, or both that extend above the conveying surface 10 to position the shoe 24 correctly above the carrier 22 for reattachment, prior to reattaching the shoe 24 to the carrier 22.

The methods can include any of assembling the shoe 24 from a base 52 and an elastomeric cover 50 for directly contacting objects being conveyed; press-fitting the elastomeric cover 50 between a lower panel and an upper panel of the base 52, which can result in biasing the upper panel 62 and the lower panel 60 away from each other; providing the upper panel 62 with one of the connector projection 72a,b and the cooperating connector member 62; providing the carrier 24 with the other of the connector projection and the cooperating connector member positioned to resist the bias of the shoe 24; and forming the shoe 24 from polyoxymethelene; and forming the base 52 of the shoe 24 from polyoxymethylene.

The foregoing description of the embodiments has been provided for purposes of illustration and description. It is not intended to be exhaustive or to limit the disclosure. Individual elements, features, or steps of a particular embodiment are generally not limited to that particular embodiment, but, where applicable, are interchangeable and can be used in other embodiments, even if the resulting combination is not specifically illustrated or described herein. The same may also be varied in any way as to the inclusion or not of other individual elements, features, or steps. Such variations are not to be regarded as a departure from the disclosure, and all such modifications are intended to be included within the scope of the disclosure.

What is claimed is:

1. A sorter conveyor apparatus comprising:
an endless upwardly facing conveying surface movable in a conveying direction, the conveying surface defined by a plurality of surfaces separated by a plurality of slots extending in a transverse direction relative to the conveying direction;
a plurality of shoe assemblies, each shoe assembly comprising a shoe disposed above the conveying surface and a carrier disposed below the conveying surface, each of the plurality of shoe assemblies extending through at least one of the slots in the conveying surface to permit each shoe assembly to move in the transverse direction while also moving in the conveying direction with the conveying surface;
each of the shoe assemblies comprising a snap-fit connection coupling the shoe and the carrier together, wherein the snap-fit connection has a structure which permits the shoe to detach from the carrier in response to an undesirable force acting on the shoe without damaging any part of the shoe assembly, and wherein the snap-fit connection has a structure that permits the shoe to be fully recoupled to the carrier manually without the use of tools after being detached from the carrier.

2. The sorter conveyor apparatus of claim 1, wherein the shoe comprises polyoxymethylene.

3. The sorter conveyor apparatus of claim 2, wherein the shoe comprises a base and a cover above the conveying surface, and the snap-fit connection is positioned to detach both the base and cover from the carrier in response to the undesirable force acting on the shoe.

4. The sorter conveyor apparatus of claim 1, wherein the endless conveying surface comprises a groove extending in the transverse direction formed by hooked shaped portion extending in one of the conveying direction and an opposite direction to the conveying direction, and wherein the shoe comprises a cooperating edge captured by the hook shaped portion and allowing the edge to slide along the groove.

5. The sorter conveyor apparatus of claim 4, wherein the endless conveying surface comprises an other groove extending in the transverse direction formed by an other hooked shaped portion extending in the other of the conveying direction or an opposite direction to the conveying direction, and wherein the shoe comprises an other cooperating edge captured by the other hook shaped portion and allowing the other edge to slide along the other groove.

6. The sorter conveyor apparatus of claim 1, wherein the snap-fit connection comprises a connector projection, and wherein the shoe assemblies further comprise a drive projection adjacent the connector projection to transfer forces between the shoe and the carrier when the shoe is driven in the transverse direction without the connector projection detaching absent exposure to an undesirable force.

7. The sorter conveyor apparatus of claim 6, wherein at least one of the connector projection and the drive projection extends from the carrier through one of the plurality of slots and above the conveying surface.

8. The sorter conveyor apparatus of claim 1, wherein the snap-fit connection comprises a connector projection including a locking surface on one of the shoe and the carrier and a cooperating connector member including a cooperating locking surface opposing the locking surface on an other of the shoe and the carrier, wherein the locking surface and the cooperating locking surface are biased against each other.

9. A sorter conveyor apparatus comprising:
an endless upwardly facing conveying surface movable in a conveying direction, the conveying surface defined by a plurality of surfaces separated by a plurality of slots extending in a transverse direction relative to the conveying direction;
a plurality of shoe assemblies, each shoe assembly comprising a shoe disposed above the conveying surface and a carrier disposed below the conveying surface, each of the plurality of shoe assemblies including a bridge extending through at least one of the slots in the conveying surface to permit each shoe assembly to move in the transverse direction while also moving in the conveying direction with the conveying surface;
each of the shoe assemblies comprising a snap-fit connection coupling the shoe and the carrier together, the snap-fit connection comprising two connector projections that each include a hook member having a locking surface, and respective cooperating locking surfaces against which one of the hook members is engaged to retain the shoe and the carrier together;
each of the shoe assemblies further comprising two drive projections, each drive projection being received in a cooperating opening to transfer forces between the shoe and the carrier when the shoe is driven in the transverse direction without the shoe detaching from the carrier absent exposure to an undesirable force; and
wherein the snap-fit connection has a structure which permits the shoe to detach from the carrier in response to an undesirable force acting on the shoe without damaging any part of the shoe assembly, and wherein the snap-fit connection has a structure that permits the shoe to be fully recoupled to the carrier manually without the use of tools after being detached from the carrier.

10. The sorter conveyor apparatus of claim 9, wherein at least one of the two connector projections and the two drive projection extends from the carrier through one of the plurality of slots and above the conveying surface.

11. The sorter conveyor apparatus of claim 10, wherein each connector projection and each drive projection is a thin member having major surfaces extending in the transverse direction, and wherein the endless conveying surface comprises a groove extending in the transverse direction formed by hooked shaped portion extending in one of the conveying direction and an opposite direction to the conveying direction, and wherein the shoe comprises a cooperating edge captured by the hook shaped portion and allowing the edge to slide along the groove.

12. The sorter conveyor apparatus of claim 11, wherein the endless conveying surface comprises another groove extending in the transverse direction formed by an other hooked shaped portion extending in the other of the conveying direction or an opposite direction to the conveying direction, and wherein the shoe comprises an other cooperating edge captured by the other hook shaped portion and allowing the other edge to slide along the other groove.

13. The sorter conveyor apparatus of claim 9, wherein the locking surface and the cooperating locking surface are biased against each other.

14. The sorter conveyor apparatus of claim 9, wherein the shoe comprises polyoxymethylene.

15. The sorter conveyor apparatus of claim 9, wherein the shoe disposed above the conveying surface comprises a base and a cover, and the releasable snap-fit connection is positioned to detach both the base and cover from the carrier in response to the undesirable force acting on the shoe.

16. A sorter conveyor apparatus comprising:
an endless upwardly facing conveying surface movable in a conveying direction, the conveying surface defined by a plurality of surfaces separated by a plurality of slots extending in a transverse direction relative to the conveying direction;
a plurality of shoe assemblies, each shoe assembly comprising a shoe disposed above the conveying surface and a carrier disposed below the conveying surface, each of the plurality of shoe assemblies including a bridge extending through at least one of the slots in the conveying surface to permit each shoe assembly to move in the transverse direction while also moving in the conveying direction with the conveying surface;
each of the shoe assemblies comprising a releasable snap-fit connection coupling the shoe and the carrier together, the releasable snap-fit connection comprising a connector projection, and a cooperating connector member upon which the hook members engage to retain the shoe and the carrier together;
wherein the shoe assembly comprises a flexible material to bias the connector projection against the cooperating member to increase the force required to detach the shoe; and
wherein the releasable snap-fit connection has a structure which permits the shoe to detach from the carrier in response to an undesirable force acting on the shoe without the shoe assembly, and wherein the snap-fit connection has a structure that permits the shoe to be full recoupled to the carrier manually without the use of tools after being detached from the carrier.

17. The sorter conveyor apparatus of claim 16, wherein the shoe comprises an elastomeric cover to directly contact objects being conveyed and a base comprising one of the connector projection and the cooperating connector member, and wherein the carrier comprises the other of the connector projection and the cooperating connector member, the elastomeric cover being coupled to the base to bias the one of the connector projection and the cooperating connector member of the base against the other of the connector projection and the cooperating connector member.

18. The sorter conveyor apparatus of claim 17, wherein the carrier comprises the connector projection in the form of a hook member, and the base comprises the cooperating connector member in the form of a surface adjacent an opening.

19. The sorter conveyor apparatus of claim 16, wherein the shoe assemblies further comprising a drive projection adjacent the connector projection to transfer forces between the shoe and the carrier when the shoe is driven in the transverse direction without the connector projection detaching absent exposure to an undesirable force.

20. The sorter conveyor apparatus of claim 19, wherein the connector projection and the drive projection lie in a common plane with the respective slot and both the connector projection and the drive projection extend from the carrier through one of the plurality of slots and above the conveying surface.

21. The sorter conveyor apparatus of claim 19, wherein the shoe comprises an elastomeric cover to directly contact objects being conveyed and a base comprising a lower panel and an upper panel with and one of the connector projection and the cooperating connector member being associated with the upper panel, and the elastomeric cover being coupled to the base between the upper and lower panels to bias the upper and lower panels away from each other, and wherein the carrier comprises the other of the connector projection and the cooperating connector member and positioned to resist the bias of the shoe.

22. The sorter conveyor apparatus of claim 21, wherein the carrier comprises the connector projection in the form of a hook member, and the base comprises the cooperating connector member in the form of a surface adjacent an opening in the upper panel.

23. The sorter conveyor apparatus according to claim 21, wherein the base comprises polyoxymethylene.

24. A sorter conveyor method for use with an endless upwardly facing conveying surface movable in a conveying direction, the conveying surface defined by a plurality of surfaces separated by a plurality of slots extending in a transverse direction relative to the conveying direction, the method comprising:
providing a plurality of shoe assemblies, with each shoe assembly comprising a shoe disposed above the conveying surface and a carrier disposed below the conveying surface, and with each of the plurality of shoe assemblies extending through at least one of the slots in the conveying surface;
coupling the shoe and the carrier together using a snap-fit connection;
causing at least some of the shoe assemblies to move in the transverse direction while also moving in the conveying direction with the conveying surface,
upon exposure to an undesirable force acting upon the shoe, the shoe automatically detaching from the carrier at the snap-fit connection without damaging any part of the shoe assembly, including the snap-fit connection; and
after such detaching, fully reattaching the shoe to the carrier manually without the use of tools using the undamaged shoe, including the undamaged snap-fit connection.

* * * * *

UNITED STATES PATENT AND TRADEMARK OFFICE
CERTIFICATE OF CORRECTION

PATENT NO.        : 8,727,097 B2                                    Page 1 of 1
APPLICATION NO.   : 13/971359
DATED             : May 20, 2014
INVENTOR(S)       : Edward Ydoate et al.

It is certified that error appears in the above-identified patent and that said Letters Patent is hereby corrected as shown below:

In the Claims

| Issued Patent | | Description of Error |
|---|---|---|
| Column | Line | |
| Column 11, | 38 | In Claim 16, before "the shoe", insert --damaging any part of--, therefor |
| Column 11, | 39 | In Claim 16, delete "full" and insert --fully--, therefor |
| Column 12, | 46 | In Claim 24, delete "surface," and insert --surface;--, therefor |

Signed and Sealed this
Twenty-third Day of September, 2014

Michelle K. Lee
*Deputy Director of the United States Patent and Trademark Office*